(12) United States Patent
Holtom

(10) Patent No.: US 6,289,788 B1
(45) Date of Patent: Sep. 18, 2001

(54) SEMI-ROTARY HYDRAULIC ACTUATOR

(75) Inventor: Stephen Wayne Holtom, Castle Hill (AU)

(73) Assignee: Farnow PTY Limited, Wetherill Park (AU)

( * ) Notice: Subject to any disclaimer, the term of this patent is extended or adjusted under 35 U.S.C. 154(b) by 0 days.

(21) Appl. No.: 09/485,427

(22) PCT Filed: Aug. 7, 1998

(86) PCT No.: PCT/AU98/00626

§ 371 Date: Apr. 13, 2000

§ 102(e) Date: Apr. 13, 2000

(87) PCT Pub. No.: WO99/08004

PCT Pub. Date: Feb. 18, 1999

(30) Foreign Application Priority Data

Aug. 8, 1997 (AU) .................................................. PO 8484

(51) Int. Cl.[7] ........................................................ F01B 9/00
(52) U.S. Cl. .................................. 92/137; 92/138; 92/140
(58) Field of Search ............................ 92/137, 140, 138; 74/25, 99 A, 99 R, 107; 417/362

(56) References Cited

U.S. PATENT DOCUMENTS

| 3,448,626 | * | 6/1969 | Yeatman et al. | 92/137 |
| 3,965,802 | * | 6/1976 | Jacobs | 92/137 |
| 4,317,505 | * | 3/1982 | Schneider | 92/137 |

* cited by examiner

*Primary Examiner*—Edward K. Look
*Assistant Examiner*—Igor Kershteyn
(74) *Attorney, Agent, or Firm*—Abelman, Frayne & Schwab

(57) ABSTRACT

An actuator for rotating a shaft includes a housing having a first port, a second port and a drive track. A first drive means is coupled to the first port and a second drive means is coupled to the second port. An array of balls which are spaced apart by spacers define a drive train extending from the first drive means to the second drive means via the drive track. A drive pin which extends outwardly from the shaft is connected to the drive train and the first and second drive means are driven so that the drive train will rotate the drive pin and hence the shaft.

9 Claims, 2 Drawing Sheets

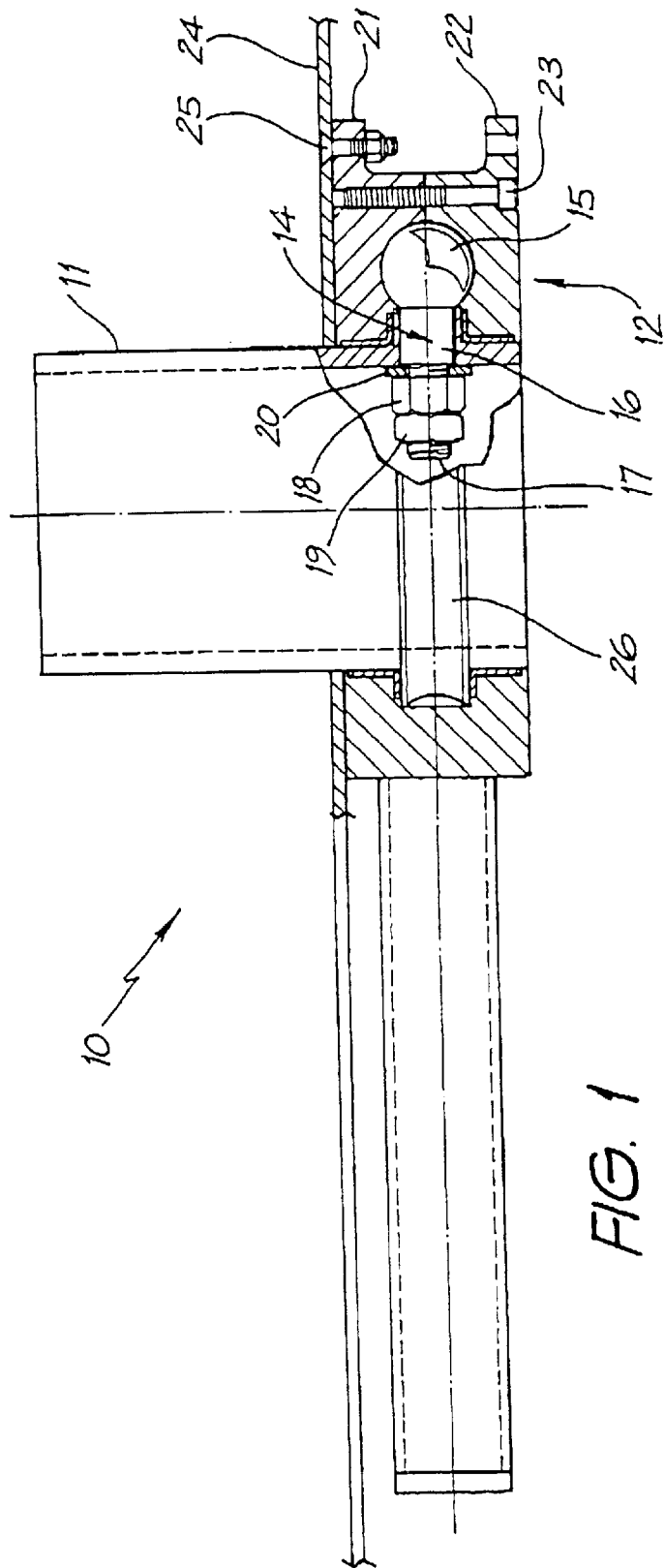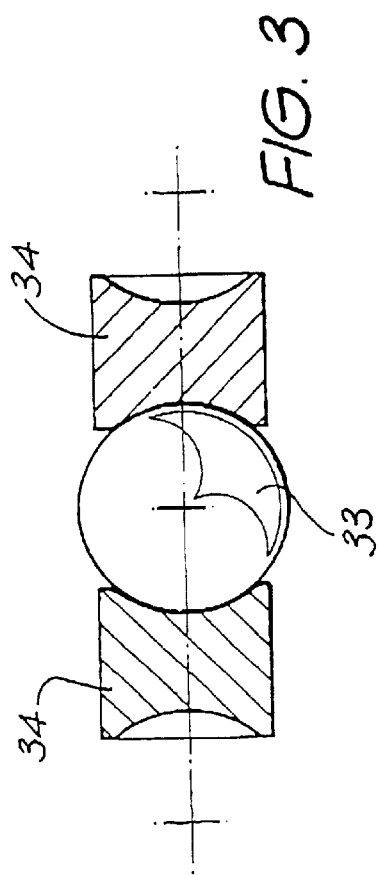
FIG. 1
FIG. 3

SEMI-ROTARY HYDRAULIC ACTUATOR

FIELD OF INVENTION

This invention relates to a semi-rotary hydraulic actuator adapted to rotate a shaft over 180°.

BACKGROUND ART

Current methods of rotating a shaft by hydraulic means include the linear actuator and crank arm system which has the disadvantage that the angle of rotation is limited to little over 90°. Furthermore, the velocity and power output varies significantly due to the increase and decrease in the crank arm's perpendicular length.

Another system for rotating a shaft about a pivot point is the rack and pinion actuator which does provide constant velocity and power output but is expensive to manufacture and has poor shock load capacity because the entire reaction force is against one tooth.

The vane-type actuator offers constant velocity but is also expensive to manufacture and suffers from inability to hold a load because of high leakage rates. Furthermore, the vane actuator is unable to sustain end of stroke shock loads.

Another prior art method of rotating a shaft about a pivot point is the linear actuator and chain drive which possesses the low cost benefit of the linear actuator and the constant velocity of the rack and pinion by using opposed cylinders to pull a chain which is engaged in a sprocket. However, this arrangement requires a very large space because of the extended length of the cylinders.

It is therefore, an object of the invention to provide an improved rotary hydraulic actuator for rotating a shaft around a pivot point which provides 180° of rotation.

SUMMARY OF INVENTION

According to the invention there is provided an actuator for rotating a shaft comprising:
(i) a housing having a first port, a second port and a drive track therein,
(ii) a first drive means coupled to the first port and a second drive means coupled to the second port,
(iii) an array of balls adjacent ones of which are spaced apart by a spacer to define a drive train extending from one drive means to the other drive means via the drive track,
(iv) a drive pin extending outwardly from the shaft connected to the drive train, and
(v) means for moving the first and second drive means so that the drive train rotates the drive pin and hence the shaft.

BRIEF DESCRIPTION OF THE DRAWINGS

FIG. 1 is a side elevational view of a semi-rotary hydraulic actuator according to one embodiment of the invention, FIG. 3 is an enlarged end view of a ball located between cups of the drive chain of the actuator.

BEST MODES FOR CARRYING OUT THE INVENTION

Figure 2:
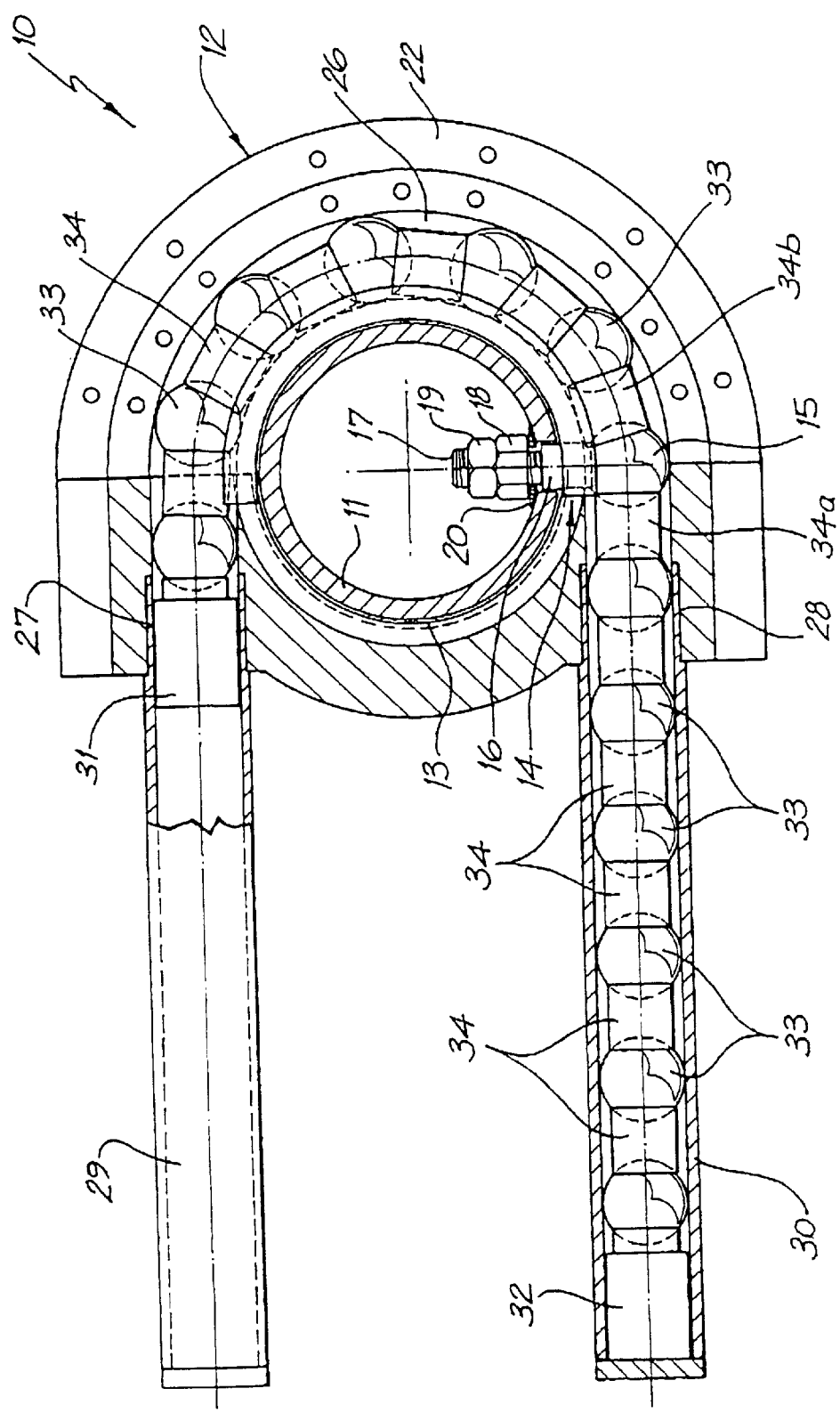
FIG. 2 is a plan view of the actuator shown in FIG. 1.

The actuator 10 shown in FIGS. 1 and 2 includes a shaft 11 rotatable within a housing 12. In this instance, the shaft 11 is hollow and is supported by bearings 13 carried by the housing 12.

Attached to the shaft 11 is a drive pin 14 which has a spherical head 15 extending from one end of a cylindrical shank 16 and a threaded tail portion 17 extending from the other end of the shank 16. An aperture in the wall of the shaft 11 receives the second end of the shank 16 with the threaded tail portion 17 in the interior of the hollow shaft 11. The pin 14 is held in position by nuts 18 and 19 and the washer 20.

The housing 12 is formed of a first portion 21 and a second portion 22 secured together by screws 23. The first housing portion 21 is secured to a mounting plate 24 by screws 25.

The housing portions 21 and 22 define a drive track 26 which extends around the shaft 11.

A first entry port 27 is provided at one side of the housing 12 and a second entry port 28 is provided at the other side of the housing to provide access to the interior of the housing. A first cylinder 29 is coupled to the first entry port 27 and a second cylinder 30 is coupled to the second entry port 28. Within the cylinders 29 and 30 there are pistons 31 and 32 which are driven by hydraulic fluid in a known manner.

Extending from the cylinder 29 to the cylinder 30 and passing around the drive track 26 there is a plurality of balls 33 that are spaced apart by ball cups 34 each of which has a semi-spherical recess at each end. The head 15 of the drive pin 14 is located between ball cups 34a and 34b in lieu of a ball 33.

The actuator is assembled by first connecting the drive pin 14 to the shaft 11. The housing 12 complete with support bearings is assembled around the shaft 11 and the drive pin 14. The steel balls 33 and the ball cups 34 are installed in turn against each side of the head 15 of the drive pin 14 through each entry port 27 and 28.

The piston 31 is then assembled into the cylinder 29 and the piston 32 installed in the cylinder 30 and the assembled cylinders connected to the housing as shown in FIG. 2.

As fluid is directed into one cylinder, its piston is forced along the cylinder and in turn pushes the balls and cups in front of it. The drive train of the balls and cups in turn apply force against the head 15 of the drive pin 14 which rotates the shaft 11 within the housing 12. The balls and cups on the other side of the drive pin are pushed against the piston in the other cylinder and hydraulic fluid is discharged from that cylinder.

A load-hold valve ensures that there is always a pre-load against both sides of the drive pin thereby eliminating any runaway of the components or the load.

The invention provides a semi-rotary actuator which can achieve a high degree of rotation with constant velocity and power output with an extremely compact size and which can be manufactured very economically.

In a modification of the invention, the ball and drive track concept is used to drive an object through a path of any configuration that can be defined by the drive tack such as a linear path, an arcuate path or a combined linear and arcuate path. In another modification of the invention, the balls are reacted upon by mechanical means rather than the hydraulic force.

Various other modifications may be made in details of design and construction without departing from the scope and ambit of the invention.

What is claimed is:

1. An actuator for rotating a shaft comprising:
   (i) a housing having a first port, a second port and a drive track therein,
   (ii) a first drive means coupled to the first port and a second drive means coupled to the second port,
   (iii) an array of balls adjacent ones of which are spaced apart by a spacer to define a drive train extending from one drive means to the other drive means via the drive track,
   (iv) a drive pin extending outwardly from the shaft connected to the drive train, and
   (v) means for moving the first and second drive means so that the drive train rotates the drive pin and hence the shaft.

2. An actuator according to claim 1 wherein each spacer is a cup having a semi-spherical recess at each end to receive part of one of the balls.

3. An actuator according to claim 1 wherein the drive pin is connected to adjacent spacers in lieu of one ball.

4. An actuator according to claim 1 wherein the drive track is arcuate.

5. An actuator according to claim 4 wherein the track is semi-circular.

6. An actuator according to claim 1 wherein the track is a linear path.

7. An actuator according to claim 1 wherein the drive track is part linear and part arcuate.

8. An actuator according to claim 1 wherein the first and second drive means comprise cylinder and piston means.

9. An actuator according to claim 8 wherein the piston is driven by hydraulic means.

* * * * *